(12) United States Patent
Steadman et al.

(10) Patent No.: US 8,352,629 B2
(45) Date of Patent: Jan. 8, 2013

(54) MEDIA STREAM CAPTURE, MODIFICATION, AND FORWARDING

(75) Inventors: Geoffrey Steadman, Brighton, MA (US); Daniel Griscom, Melrose, MA (US); Mark Phillips, Maynard, MA (US); Edmund MacKenty, Watertown, MA (US)

(73) Assignee: 25-Seven Systems, Inc., Boston, MA (US)

( * ) Notice: Subject to any disclaimer, the term of this patent is extended or adjusted under 35 U.S.C. 154(b) by 186 days.

(21) Appl. No.: 12/731,729

(22) Filed: Mar. 25, 2010

(65) Prior Publication Data

US 2010/0250703 A1 Sep. 30, 2010

Related U.S. Application Data

(60) Provisional application No. 61/163,549, filed on Mar. 26, 2009.

(51) Int. Cl.
*G06F 15/16* (2006.01)

(52) U.S. Cl. ............. 709/232; 725/32; 725/44; 386/287

(58) Field of Classification Search .................. 709/231, 709/217, 232; 348/512; 713/201, 200; 370/352; 386/294, 52; 725/32, 110, 46
See application file for complete search history.

(56) References Cited

U.S. PATENT DOCUMENTS

| 5,751,368 | A   | * | 5/1998  | Cooper          | 348/512 |
|-----------|-----|---|---------|-----------------|---------|
| 6,901,209 | B1  | * | 5/2005  | Cooper et al.   | 386/294 |
| 8,091,111 | B2  | * | 1/2012  | Logan et al.    | 725/110 |
| 8,136,133 | B2  | * | 3/2012  | Walker et al.   | 725/32  |
| 2002/0116629 | A1 | * | 8/2002 | Bantz et al.    | 713/200 |
| 2005/0091537 | A1 | * | 4/2005 | Nisbet et al.   | 713/201 |
| 2005/0254483 | A1 | * | 11/2005 | Factor et al.  | 370/352 |
| 2007/0250863 | A1 | * | 10/2007 | Ferguson       | 725/46  |
| 2007/0297755 | A1 | * | 12/2007 | Holt et al.    | 386/52  |
| 2009/0031037 | A1 | * | 1/2009 | Mendell et al.  | 709/231 |
| 2009/0288112 | A1 | * | 11/2009 | Kandekar et al.| 725/32  |

* cited by examiner

*Primary Examiner* — Dustin Nguyen
(74) *Attorney, Agent, or Firm* — Weingarten, Schurgin, Gagnebin & Lebovici LLP (57) ABSTRACT

A transmission delay system, an improvement to a transmission delay system, and a method of delaying a transmission for removing undesired content from an input media stream; for excising, recording, storing, and logging, the undesired content; and for automatically providing message alerts through a network to at least one message alert recipient that an excision event has occurred.

19 Claims, 3 Drawing Sheets

MEDIA STREAM CAPTURE, MODIFICATION, AND FORWARDING

CROSS REFERENCE TO RELATED APPLICATIONS

This application claims the benefit of provisional patent application No. 61/163,549 filed on Mar. 26, 2009.

STATEMENT REGARDING FEDERALLY SPONSORED RESEARCH OR DEVELOPMENT

N/A

BACKGROUND OF THE INVENTION

1. Field of the Invention

The present invention involves a transmission delay system, a method of delaying a transmission, and an improvement to a transmission delay system and, more particularly, to a transmission delay device and method and an improvement thereto that excises, records, logs, and time- and date-stamps undesired content from an input media stream and automatically provides message alerts that an excision event has occurred to at least one message alert recipient.

2. Background of the Invention

The Federal Communications Commission (FCC) regulates and prohibits the airing, broadcast or re-broadcast on terrestrial radio and commercial television of or inappropriate language, e.g., "the seven dirty words" made famous by comedian George Carlin, that is deemed profane. Violators are typically fined heavily for each transgression. For example, the FCC imposed a stiff $550,000 fine on the Columbia Broadcasting Company (CBS) for the Janet Jackson Super Bowl "costume malfunction" and has imposed fines on a former terrestrial radio "shock jock" that exceed two-and-a-half million dollars.

To prevent inappropriate or undesired content transmissions and to avoid heavy fines, broadcasters and station managers employ an audio and/or video device that delays the amount of time it takes for an incoming, media stream signal to reach and be broadcast by the system's transmitter. Typically, after identifying inappropriate language, a human operator or an automatic censor will intervene and activate a trigger mechanism that excises the offensive language, preventing profane or otherwise undesired content from being broadcast. This often results in a brief period of "dead-air" time (silence) or a "bleep" or other sound may replace the offensive language.

Heretofore, the removed undesired language is merely excised and all-but-forgotten, which is to say that the undesired portion of the transmission is cut out or overwritten by "dead-air" or by a "bleep" sound. However, it would be desirable to improve current broadcast delay systems to chronicle what actually took place "off air", which is to say that, instead of excising the content altogether, the content as well as a user- or operator-selectable amount of audio and/or video content, such as the audio and/or video content occurring immediately before and immediately after the delay increment, is recorded and saved. Advantageously, the latter attribute facilitates comparison between the content in broadcast output media stream data and the content in input media stream data files.

It would be further desirable to identify and to log each piece of excised media by time- and date-stamping the media at the time of incidence and, further, to notify, e.g., via electronic mail (email) message, text message, instant messages, telephone message, and the like, that a profanity or content excision has taken place. Such notifications can include text, graphics, attachments of media files, such as audio or video files, metalinks to the media files, URL links to the media files, and so forth. Use of these notifications and media can be used by broadcast and media company personnel to demonstrate compliance with corporate, government, and community standards of obscenity, profanity, and decorum. The data further eliminate the "he-said/she-said" finger pointing that may otherwise occur after a profanity excise incident.

SUMMARY OF THE INVENTION

A transmission delay system for removing undesired content from an input media stream prior to transmission of a time-delay version of the input media stream is disclosed. The system includes: a delay transmission buffer memory that is structured and arranged to receive and to store a temporal quantity of the input media stream in a buffer or a plurality of buffers; an interrupt/delay device that is structured and arranged to receive the input media stream and to monitor the input media stream and/or the input media stream stored in the buffer or plurality of buffers, to identify undesired content. When such content is identified, an indicator that is automatically or manually activated is adapted to designate an indicated region of undesired content contained in the input media stream in the buffer or the plurality of buffers; and an excise device that excises the undesired content from the indicated region in the buffer or plurality of buffers; memory for storing the undesired content; a device for preparing and transmitting a message alert about the excision event to a message alert recipient; and a media output device that is structured and arranged to transmit an output media stream from the buffer or plurality of buffers of the delay transmission buffer memory in a temporal, first-in first-out sequence.

The system further comprises at least one of a Web server, to allow users to communicate with and modify the system remotely; memory for storing the input media stream; a database containing a plurality of internal audio or video files, any one of which is useable by the media output device and/or the interrupt/delay device to overwrite, time expand, and/or time compress the excised undesired content at the indicated region in the buffer or the plurality of buffers; and memory for storing the output media stream.

Also disclosed is an improvement to a transmission delay system, the improvement including a delay transmission buffer memory that is structured and arranged to receive and to store a temporal quantity of an input media stream in a buffer or a plurality of buffers; memory for storing undesired content from the input media stream; and a device for preparing and transmitting a message about the excised undesired content to a message alert recipient.

Finally, the invention discloses a method of delaying a transmission of an input media stream by a pre-determined time delay. The input media stream includes a first content portion to be transmitted and a second content portion that is either not to be transmitted at all or is to be transmitted at a later date and time. Preferably, the method includes receiving the input media stream at a first time; building a delay transmission buffer memory of input media stream, the delay transmission buffer memory adapted to store a temporal quantity of input media stream; monitoring the input media stream in the delay transmission buffer memory to identify any second content portion; excising or copying the identified second content portion to a first memory; storing the second content portion in the first memory; issuing at least one message alert over a network to at least one message recipient; and transmitting a time-delayed, monitored version of the input media stream after the pre-determined time delay. The time-delayed, monitored version will include the second content portion when that portion is copied to the memory but does not include the second content portion when that portion is excised.

BRIEF DESCRIPTION OF THE SEVERAL VIEWS OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention and include.

DETAILED DESCRIPTION OF THE INVENTION

The following glossary of terms is provided:

media stream: a time-organized sequence of analog or digital media samples, which can include audio, visual, or textual data, compressed or uncompressed, as well as other data, such as, without limitation, links to Web addresses or URLs, or GPIO signals;

notification network: any communications system such as, without limitation, a local area network (LAN), a wide area network (WAN), the World Wide Web, the Internet, and/or an intranet to recipients designated by the administrator of the system;

region: a contiguous series of media samples within a media stream;

indicated region: a region that has been marked for excision;

excise, excising, excision or excised: verb, gerund, noun or adjective for removing an indicated region from a media stream, sometimes known as dumping;

excision event: the removal of a specific indicated region from a media stream;

undesired content: a portion of a media stream that is undesired;

discriminator: an agent that distinguishes between desired and undesired content, such as, without limitation, a human, a software program, or an electronic circuit;

input media stream: a media stream that is supplied to the system, improvement or method;

output media stream: the media stream yielded after processing by the system, improvement or method, from which indicated regions have been excised; and media buffer: delay transmission buffer memory that is structured and arranged to receive and to store a temporal quantity of media data in a buffer or a plurality of buffers.

Provisional patent application No. 61/163,549 filed on Mar. 26, 2009 with the same title is incorporated herein in its entirety by reference. The invention will be described in detail in the context of a transmission delay system and a corresponding improvement to a transmission delay system. However, the invention can be used in other applications that include a manual or an automatic means of detecting unwanted material ("undesired content"); means for excising an indicated region containing undesired content and for replacing the excised indicated region with other material and/or filling it by time expansion; and means for storing the excised undesired content and for sending a message about the occurrence and/or sending the excised undesired content to a third party. For example, another possible application includes use with an automatic blog system to prevent undesired content, e.g., copyrighted material, potentially libelous material, politically incorrect material, and profane material, from being posted on the blog. The undesired content may also be as "innocent" as a business plug, a noxious background noise, e.g., feed-back, an unexpectedly active or dropped microphone, an emergency alarm, and the like, a reference made to an unsponsored product or a reference to another, competing transmission station. Those skilled in the art can appreciate the myriad of applications of the invention as described.

The improvement includes a device and the related means for excising and capturing, i.e., storing, saving, logging, recording, and the like, an input media stream that has been monitored for undesired content; for logging the date and time, i.e., date- and time-stamping, of occurrence of the undesired content; for logging the physical or electronic address of the data record of the excised indicated region; and for alerting at least one message alert recipient via a notification network that an excision event has occurred, that the undesired content has been captured and logged, and that a recording of the undesired content is available for review.

Message alerts via a notification network can occur by email, by instant message, by telephone message, by serial link, and so forth. The message alerts can be a media stream that may include an electronic copy or data file of the excised undesired content and/or may provide the address of or a metalink to the stored undesired content.

Figure 1:
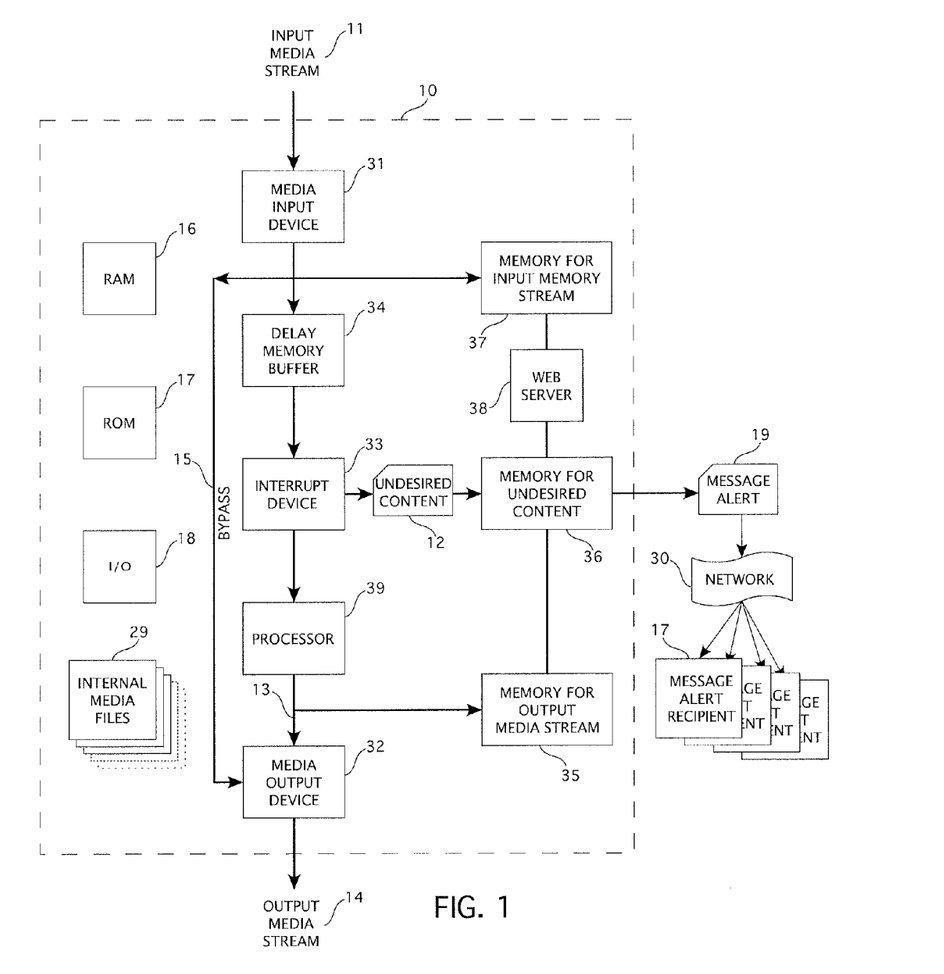
FIG. 1 shows a block diagram of a transmission delay system in accordance with the present invention.

Referring to FIG. 1, there is shown a transmission delay system 10 that includes the improvement of the present invention. The general purpose of transmission delay systems 10 is well known to the art and will not be described in great detail. In short, the system 10 is structured and arranged between a media input device 31, e.g., an IP feed, an analog/digital (A/D) converter, and so forth, and a media output device 32, e.g., an IP feed, a digital/analog (D/A) converter, and so forth, inter alia, to detect and excise undesired content from the input media stream 11 so that the undesired content 12 is not included in the output media stream 14. Moreover, the excised undesired content 12 is stored and logged in memory 36 provided therefore and the output media stream 14 is stored and logged in memory 35 provided therefore for comparison purposes. A message alert 19 is then transmitted to a message alert recipient 17 via a notification network 30.

The system 10 includes a media input device 31, a media output device 32, an interrupt (excising) unit 33, a delay transmission buffer memory (or "media buffer") 34, memory for the output media stream 35, memory for the excised undesired content 36, memory for storing the input media stream 37, a Web server 38, and a controller (processor) 39.

An input media stream 11 enters the system 10 via the input media device 31 and exits the system 10 via a media output device 32. After the input media stream 11 enters the system 10, the input media stream 11 is buffered, which is to say, data from the input media stream 11 are placed in a buffer or in a series of buffers that make up a delay transmission buffer memory 34. Henceforth, for purposes of brevity and clarity, the invention will be described in terms of an input media stream 11 that is an audio signal. However, the invention is not to be construed as being limited thereto as it also applies to any media steam.

Returning to the system 10, the delay transmission buffer memory 34 is structured and arranged to provide a time-delay buffer(s) and/or memory for temporarily holding a temporal quantity of the input media stream 11 for a pre-determined period of time, i.e., the time delay, and until such time as the time-delayed, monitored signals 13 are fed to the output media device 32 for transmission. Preferably, the temporal quantity of the input media stream 11 stored in the delay transmission buffer memory 34 exceeds the temporal length of the time delay. For example, the delay transmission buffer memory 34 can be structured and arranged to hold 10 to 60 minutes of the input media stream 11 while the time delay, which is to say the elapsed time between the input media stream 11 and the output media stream 14, can be five to ten seconds.

While the input media stream 11 is being buffered and stored in the delay transmission buffer memory 34, the content of the input media stream 11 is being monitored, manually or automatically, in real-time for undesired content. If the time-delayed, monitored signal 13 does not contain undesired content, then, at the expiry of the time delay, the time-delayed, monitored signal 13 is fed to the output media device 32 for transmission. Transmission occurs in a first in, first out (FIFO) sequence. Hence, time-delayed, monitored signals 13 pass from the delay transmission buffer memory 34 via the interrupt (excising) unit 33 to the output media device 32. The output media stream 14 of time-delayed, monitored signals 13 can be stored in a memory for the output media stream 35. The use of the contents of the memory for the output media stream 35 is described below.

If, however, undesired content 12 is detected in the input media stream 11 during the monitoring and while the input media stream 11 is still in the delay transmission buffer memory 34, the interrupt (excising) unit 33, e.g., a "dump box" and corresponding software, is adapted to automatically activate or is manually activated, e.g., by GPIO trigger, by activating a web remote, or by pushing an excise (dump) button (25 in FIG. 2), which serves to excise the undesired content 12. In contrast with the prior art, according to the present invention, the "excision event" or "excising" results in a number of activities.

First, "excising" causes the excised undesired content 12 stored in the delay transmission buffer memory 34 to be deleted totally, or to be replaced or overwritten, e.g., with an internal audio file such as a "bleep", a laugh-track, an applause-track or simply with gibberish, using contents from an internal media file database 29. When deleted totally, the system 10 outputs the input media stream 11 from immediately prior to the indicated region and the input media stream 11 from immediately after the indicated region in a continuous transmission as though the excised undesired content 12 was never included in the input media stream 11.

In short, once the time-delayed, monitored signal 13 passes through the output media device 32 for transmission, the output media stream 14 may have been collapsed ("jumping"), may include dead-air, or may include a "bleep" or other overwriting in lieu of the undesired content 12. As mentioned hereinabove, the output media stream 14 from which the undesired content 12 has been removed (and collapsed, bleeped or otherwise overwritten) is stored and logged in the memory for the output media stream 35.

Second, the interrupt (excise) unit 33 causes monitored data containing the undesired content 12 to be excised from the delay transmission buffer memory 34 and to be written to the memory for undesired content 36, where the data can be logged, e.g., date- and/or time-stamped, and stored. Advantageously, the logged and stored data provides an archive and a time-referenced history of occurrences of undesired content 12 that can remain locally, e.g., in the memory for undesired content 36, or can be exported and stored remotely, e.g., in a remote archival memory (not shown).

The undesired content 12 stored in the memory for undesired content 36 (or the remote archival memory) and the data stored in the memory for the output media stream 35 can be used by message alert recipients 17 and others to compare a recording of the actual output media stream 14 with a recording of the excised, undesired content 12. Optionally, if desirable, the original, pre-monitored, input media stream 11 could also be stored in memory for the input media stream 37 if it is desirable to have a recording of such data.

Although the invention has been described as having undesired content 12 stored in the memory for undesired content 36 and the output media stream 14 stored in the memory for the output media stream 35, this is not to say that the two cannot be saved in the same memory. Indeed, when undesired content 12 is logged, e.g., date- and time-stamped, the corresponding output media stream 14 to that date- and time-stamp can be paired with the undesired content 12 in a single memory.

Having described the system, an excision operation will now be described. An excise button can be manually-operated by a discriminator, e.g., a human censor, or can be an automatic discriminator that is programmed to identify certain undesired content. In the case of the former, the human discriminator depresses and releases an "excise button" (25 in FIG. 2) as soon as he/she hears undesired content within the input media stream 11 that is already stored or is being stored in the delay transmission buffer memory 34. If the undesired content is "long winded", it may be necessary for the operator to press the excise button again or to hold down the excise button 25 until the undesired content has completed. Because, regardless of the acceptability of the input media stream 11, the interrupt (excise) unit 33 and/or the processor 39 automatically provides a time delay, e.g., five or ten seconds, between the input media stream 11 and the output media stream 14, the discriminator is able to excise the undesired content 12 before it can be transmitted.

Time expansion refers to a method by which, after removing the undesired content 12 from the input media stream 11, the latter is slowed down without changing its pitch. The slow down allows the delay transmission buffer memory 34 to continue to receive input media streams 11 in real-time, while the output media device 32 transmits the output media stream 14 at a slower rate than real-time. Eventually, the time difference between the input media stream 11 and the output media stream 14 is equal to the time delay, i.e., the "full delay".

There are different ways to approach the problem of creating a time expansion algorithm. In some instances, a level or gap detect is used (not shown) in which brief silences are added to existing silences in the input media stream 11. In doing this, the added silence produces a slower output and eventually builds a delay. A more sophisticated technique involves duplicating small segments of the desired portion of the input media stream 11. For example, by elongation a vowel or consonant can be made longer in an unperceivable or substantially unperceivable manner. This slows down the output media stream 14, making it longer than the input media stream 11.

More preferably, time expansion can be used to gradually rebuild the delay, which has been shortened by removing undesired content of the input media stream 11, to avoid having "dead-air", a "bleep", and so forth in the transmission. Time expansion separates time and pitch, slowing time down without changing pitch. Those of ordinary skill in the art are aware of the myriad methods of performing time manipulation.

Transmission delay systems prevalent in the prior art merely dispose of the "excised" material, i.e., the undesired content 12. In contrast, according to the present invention, the excised undesired content 12 is stored in the memory for undesired content 36 and the time and date of occurrence are logged with the data of the occurrence itself. Moreover, a message alert 19 can be automatically transmitted via a network 30 to one or more message alert recipients 17, e.g., a program manager, station manager, compliance officer, legal counsel, and the like. In short, the improvement includes an undesired content excision, storage, and transmission device(s) that alert(s) interested parties 17 of an excision event; and that, furthermore, create(s) an archive of excised undesired content 12 for an interested party 17 or another third party to review.

Preferably, the excised, undesired content 12 also include short portions, e.g., one or ten or more seconds in length, of the input media stream 11 that immediately precede and immediately follow the indicated region of the undesired content 12. This facilitates comparison and authentication of the undesired content 12 with the output media stream 14. To that end, the interrupt (excise) unit 33 can be pre-programmed to automatically add a few seconds or fractions of a second immediately before and immediately after the indicated region.

Figure 2:
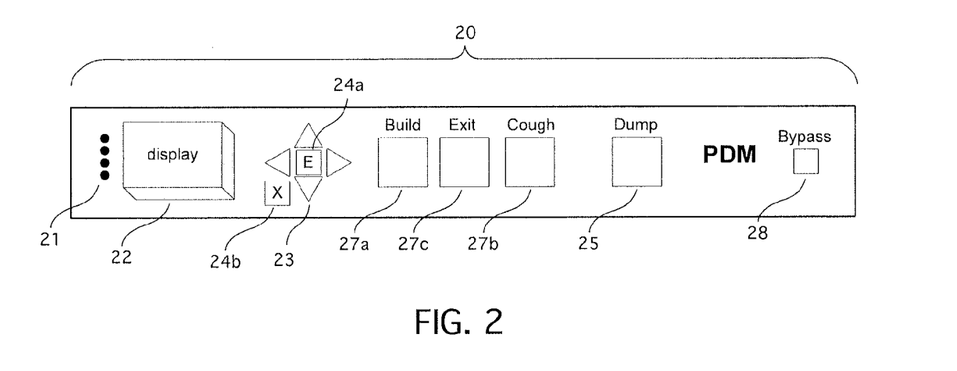
FIG. 2 shows an illustrative embodiment of a user input interface of a transmission delay system in accordance with the present invention.

The system 10 includes computing and processing portions 39 that can include components such as a printed circuit board (PCB) or motherboard, volatile memory, e.g., random access memory (RAM) 16, non-volatile memory, e.g. read-only memory (ROM) 17, a display device (22 on FIG. 2), and a front-panel input/output (I/O) board 20 (FIG. 2). A flash module can be used as a hard drive in the processing device 39. The rear-panel board can include a plurality of I/O interfaces 18, e.g., an RS232 port, an RS485 port, general purpose input/output (GPIO) connections, and the like, to permit remote communication with a variety of systems and devices.

These I/O interfaces 18 allow remote computers or other remote devices to operate and/or to interact with the system 10 via a notification network 30. More particularly, the I/O interfaces 18 increase the number of means and methods for accessing an external network 30, e.g., a LAN, WAN, the World Wide Web, the Internet, an intranet, and the like. Indeed, part of the benefit of using a general purpose computing platform 39 is the networking possibilities, e.g., networking, Network Time Syncing, emailing, using a Web server, and many other standards, and the multiplicity of protocols to which delay applications can easily be attached.

Access to a notification network 30 and the means and methods for accessing the network 30 make updating the software stored in the system 10, e.g., via the Internet, easier. For example, using a secure shell (SSH) connection, an operator at a client-end system can call a server(s) through the network 30 e.g., using an application stored on the system 10, which enables an application on the network 30 to enter the system 10 and to update its sources.

As previously mentioned, the excising of undesired content 12 corresponding to the portion of an time-delayed, monitored signal 13 that was not part of the output media stream 14 and/or the storage of the same in the memory for undesired content 36 also automatically triggers the transmission of a message alert 19 to one or more message alert recipients 17 via a notification network 30. The type and nature of the transmission and/or the content of the message alert 19 can be endless. For example, the message alert 19 can be a text or graphical email message. Further, the email message may or may not include an electronic version of the undesired content 12; may or may not include a metalink to the address where the undesired content 12 is stored; may or may not include a metalink to the address of the input media stream 11; and may or may not include a metalink to the address of the output media stream 14. Message content can also include the date and time of the occurrence, which can be included when the data are originally logged at the time of storage.

Optionally, if the system 10 includes speech recognition software, the audio content can also be converted to textual data, which can be included in the alert message 19. Here again, although the invention has been described as having undesired content 12 stored in the memory for undesired content 36 and the output media stream 14 stored in the memory for the output media stream 35, this is not to say that the two cannot be saved in the same memory. Indeed, when undesired content 12 is logged, e.g., date- and time-stamped, the corresponding output media stream 14 to that date- and time-stamp can be paired with the undesired content 12 in a single memory. Hence, the alert message 19 can also include a recording or data of the paired output media stream 14.

Different message alerts 19 can also be sent to different message alert recipients 17. For example, the station manager may receive a message alert 19 informing him/her of the incident, while the legal department may receive a message alert 19 that includes a data file of the undesired content 12 and/or a metalink to the same.

To facilitate communication via the World Wide Web and the Internet, a Web server 38 can be included in the system 10. The Web server 38 allows browser-based remote access and remote control of the system 10 via the network 30. Accordingly, a user can use common browsers, such as Internet Explorer (Microsoft Corporation), Firefox (Mozilla Foundation), and the like, to communicate with the system 10 remotely. As a result, some users can adjust settings and configuration parameters remotely via a Web browser-based GUI (not shown) rather than having to do so using the front panel I/O devices 20 such as shown in FIG. 2.

Referring to FIG. 2, an illustrative front panel 20 of a transmission delay system 10 includes an input level meter 21, a display device 22, a navigational device 23, an enter device (button) 24a, a cancel device (button) 24b, a bypass device (button) 28, a plurality of special function devices (buttons) 27, and the excise device (button) 25. The excise button 25 has been discussed above. The input level meter 21, which can include a plurality of light-emitting sources, such as light-emitting diodes (LEDs), is adapted to provide visual indication of the audio level. The display device 22, e.g., a liquid crystal display (LCD) display device, provides a visual display for data and messages.

The navigational device 23 can include a plurality of directional (cursor) buttons that are adapted to enable a local operator to navigate through data and queries displayed on the LCD display 22. The enter button 24a enables operators to open menus for display on the LCD display 22 and to confirm (store) changes. The cancel button 24b enables operators to exit or close a menu without making any changes thereto.

The bypass button 28 clears any data stored in the delay buffer transmission memory 34 and can be also be used to bypass (15 in FIG. 1) the delay buffer transmission memory 34 immediately, which is to say, that the bypass button 28 connects the input media device 31 to the output media device 32 directly, so that input media stream 11 passes directly to be transmitted without time-delay or monitoring. The plurality of special function buttons 27 can include, for example and not for the purpose of limitation, a build button 27a, a cough button 27b, and an exit button 27c. The build button 27a signals the system 10 to start building the media buffer 34, which is to say, to begin storing the input media stream 11 in the delay buffer transmission memory 34. The cough button 27b has a slightly different function from the excise (dump) button 25. The cough button 27b has no immediate affect on the media buffer 34 but instead ensures that the input media stream 11 never enters the media buffer 34. Hence, the data, e.g., a cough or a sneeze, is not saved and a message alert is not transmitted.

Similar to the bypass button 28, the exit button 27c is used to take the transmission delay system 10 off-line while maintaining the system in a ready state, so that the input media stream 11 becomes the output media stream 14 without any time delay or monitoring. Unlike the bypass button, however, activating the exit button 27c causes the system 10 to stop storing the input media stream 11 in the delay transmission buffer memory 34 and to send data already in the delay transmission buffer memory 34 to the media output device 32 for transmission in a FIFO manner. Thus, the system 10 gradually collapses the delay transmission buffer memory 34 to a value of zero when the exit button 27c is used, rather than an immediate collapse of the delay transmission buffer memory 34 when the bypass button 38 is used. Preferably, the data in the delay transmission buffer memory 34 are subtly speeded up by time compression so that the content stored in the delay transmission buffer memory 34 will rejoin real-time imperceptibly.

Figure 3:
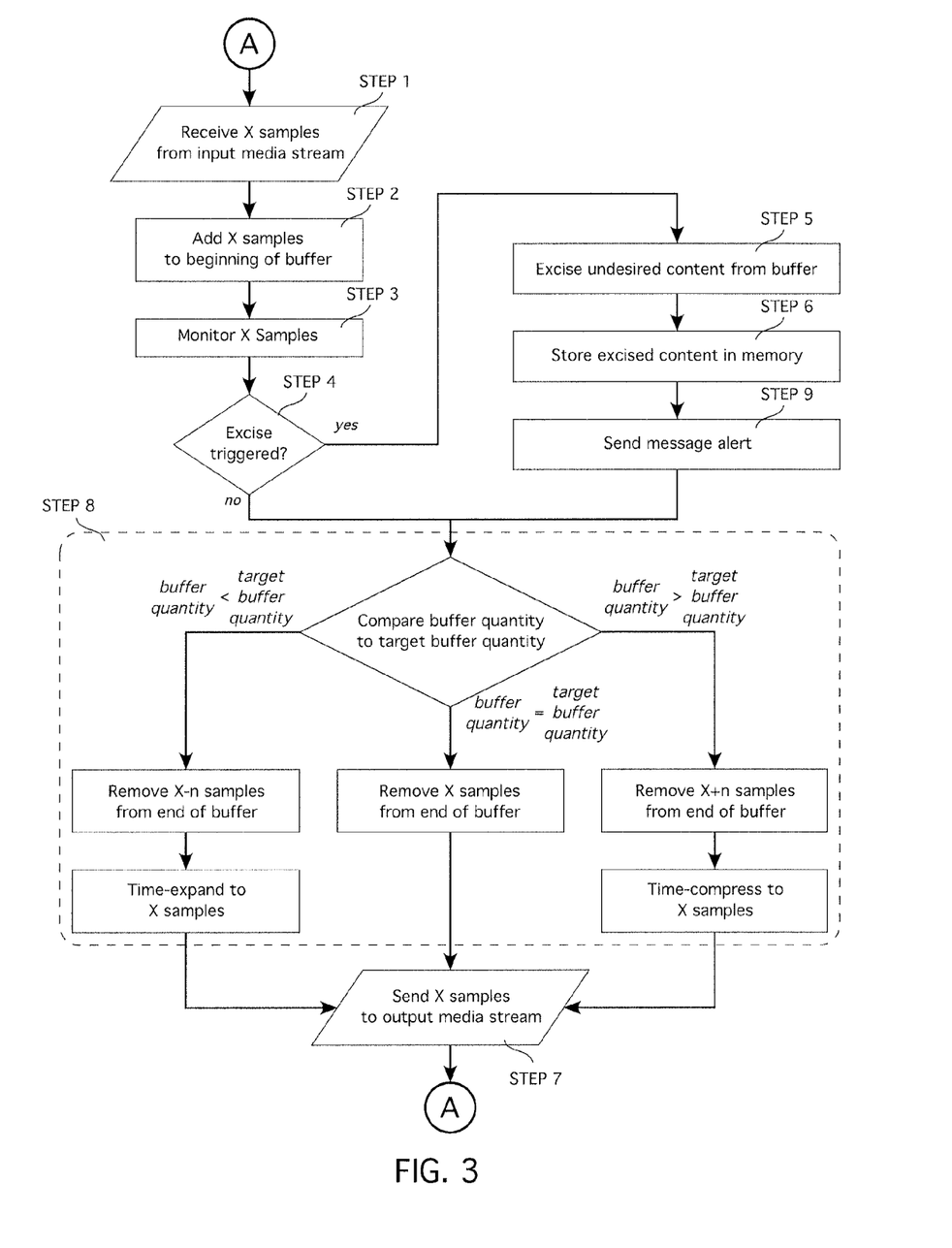
FIG. 3 shows a flow chart of a method of delaying a transmission in accordance with the present invention.
Figure 4:
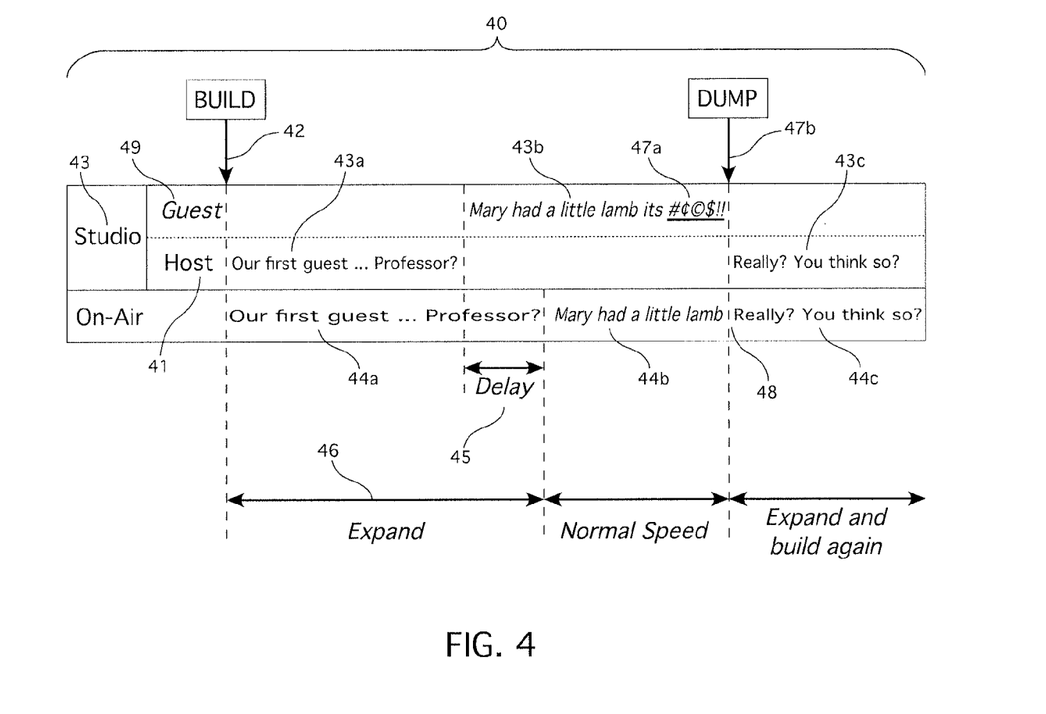
FIG. 4 shows a time chart between a build delay memory buffer event and a transmission delay ("excise") event in accordance with the present invention.

Having described a transmission delay system and an improvement thereto, a method of transmission delay will now be described. FIG. 3 shows an illustrative flow chart of such a method while FIG. 4 shows how building the delay memory and an excision event work. Although the case of a human discriminator ("operator") pressing an excise button is used in this description, those of ordinary skill in the art can appreciate the ease of adapting the technology to an automated system that automatically detects some event and automatically performs the sequence of steps. Moreover, the "pressing of a excise button" does not have to entail a human digit pushing a button, but, rather, "excising" could be performed automatically, e.g., an algorithm or another computer that sets the excising and recording process in motion.

After activating the transmission delay system 10, and as the input media stream 11 is received (STEP 1), the input media stream 11 is slowed down from immediate transmission while a delay transmission buffer memory 34 having a pre-determined temporal length is built (STEP 2). Preferably, the delay transmission buffer memory 34 is built (STEP 2) seamlessly without interrupting programming or time-delayed transmissions. More preferably, the delay transmission buffer memory 34 is adapted to hold a greater temporal quantity of the input media stream 11 in the delay transmission buffer memory 34 than is needed for a single "excision event".

While the delay transmission buffer memory 34 is being built, signals output in the output media stream 14 can use filler material or can stretch the input media stream 11, which is to say, by time-expansion techniques, by broadcasting preprogrammed media playback, e.g., recorded jingles or other suitable filler content that is/are stored in the internal media file memory 29, by pre-rolling material from another input media stream or taped-feed source, and/or by triggering an automation or cart replacement system to transmit media until the delay transmission buffer memory 34 is filled.

As soon as there are sufficient data from the input media stream 11 in the delay transmission buffer memory 34, which is to say that the temporal quantity of the input media stream 11 stored in the delay transmission buffer memory 34 exceeds the time delay, the stored input media stream 11 can be monitored for undesired content (STEP 3). As long as the buffered input media stream 11 contains appropriate ("desired") content, the discriminator or the system 10 does nothing. However, as soon as undesired content 12 is identified (STEP 4), e.g., aurally or automatically, the undesired content 12 of the input media stream 11 is "excised" (STEP 5), to prevent transmission of the same. The size of the portion of the buffered input media stream 11 to be excised, e.g., the "excision event", which is to say the actual (temporal) length (usually a few seconds) of the input media stream 11, can be pre-established prior to operation of the system 10 and can be selectively modified at any time during operation of the system 10.

During the "excision event", some portion of the input media stream 11 stored in the delay transmission buffer memory 34 is excised from the delay transmission buffer memory (STEP 5). That portion of the excised undesired (or copied desired) content 12 in the delay transmission buffer memory 34 is designated or identified coincident with the depression of the excise button 25. More specifically, at the time the excise button 25 is depressed, a pointer or similar device designates, i.e., marks, a region in the delay transmission buffer memory 34 for excision. This region is the "indicated region" and corresponds to a temporal beginning of the undesired content 12, i.e., the "record head", within the delay transmission buffer memory 34. The temporal quantity of undesired content to be excised is measured from the data most recently stored in the delay transmission buffer memory 34. Preferably, the excised undesired content 12 has a pre-determined temporal length, e.g., a few seconds or fractions of a second measured from the pointer, which, more preferably, is less than the temporal quantity of the delay transmission buffer memory 34.

The "record head" is always current while the "play head", corresponding to the first data out to the output media device 32, can be stored anywhere in the delay transmission buffer memory 34. Hence, for the delay transmission buffer memory 34, media files using an in-region, i.e., at the "record head", and an out-region, i.e., at the end of the pre-determined out-take length, can accommodate removal of the data contained therebetween without having to interrupt the delay transmission buffer memory 34 from storing a fresh, input media stream 11. The in- and out-regions can be generated automatically; can be set manually by the user playing back the buffer or can be set manually using a graphic display with time display.

Preferably, measurement of the undesired content 12 for any "excision event" will include input media stream data from the delay transmission buffer memory 34 that occurred a little bit before the pointer and data from the delay transmission buffer memory 34 that occurred a little bit after the pre-determined length of time. After and/or during a "excision event" (STEP 5), the input media stream 11 is continuously received (STEP 1), the delay transmission buffer memory 34 is continuously fed (STEP 2), and the input media stream 11 is continuously monitored (STEP 3) for undesired content 12.

FIG. 4 shows an illustrative timeline 40 between a build operation 42 and an "excision event" 47. The content of the output media stream 14 (in FIG. 1) and input media stream ("studio") 43 are shown vertically while time is shown horizontally. While the delay transmission buffer memory 34 (STEP 2) is being built, studio signals 43a show a conversation between a host 41 and a guest 49, which are recorded and stored sequentially, i.e., buffered, in the delay transmission buffer memory 34. While the delay transmission buffer memory 34 is being filled 46, the output media stream 44a is aired in an expanded form as shown, gradually increasing the delay until the temporal quantity of the input media stream 11 buffered in the delay transmission buffer memory 34 reaches the desired time delay value. Once the delay transmission buffer memory 34 is filled 46, studio signals 43b are only transmitted 44b after the pre-determined time delay 45.

As soon as or once undesired content 47a is detected, the excise button 25 is activated 47b, and the undesired content 48 is identified and removed (STEP 5) from the delay transmission buffer memory 34. The portion of the delay transmission buffer memory 34 lost due to the excision event (STEP 4) is then re-built (STEP 2).

One of the ways to remove undesired content (STEP 5) is by flushing the buffer(s) containing the undesired content 12. In place of the flushed data, preferably, the affected space in the delay transmission buffer memory 34 is re-built by time expansion techniques (STEP 8), which means that as input media stream 11 continues to enter the system 10 and to be stored in the delay transmission buffer memory 34, only the output media stream 14 is output at a slower rate.

The temporal difference between the input media stream 11 input rate and the output media stream 14 output rate accumulates and re-builds the delay transmission buffer memory 34. When the delay transmission buffer memory 34 is again full, the system 10 enters a real-time play mode (STEP 7) in which the rate of the input media stream 11 entering the system 10 (STEP 1) is the same as the rate of the output media stream 14 being transmitted by the system 10 (STEP 7) with the time delay added.

The flushed data 12 corresponding to the undesired content 12 are stored in the memory for undesired content 36 (STEP 6). More particularly, once an excision event (STEP 5) has been captured in the memory for undesired content 36 (STEP 6) and/or a database, a signal and/or a message is/are transmitted 19, via a network 30, to a message alert recipient 17 (STEP 9). The capture step (STEP 6) and the signaling step (STEP 9) can occur simultaneously and can be performed by the same device or system. Indeed, either or both of the interrupt device 33 and the memory for undesired content 36 can be adapted to automatically generate message alerts 19, e.g., email notices and to transmit them to a message alert recipient(s) 17.

Preferably, prior to operation and excising, the discriminator will have programmed into the interrupt device 33 and/or the memory for undesired content 36 at least one message alert destination 17, e.g., an email address, cellular or other telephone number, URL address, and the like, where the message alerts 19 (STEP 9) are to be sent. The content of the message alerts 19 can also be pre-established and variable. For example, the message alert 19 can be a text or a graphical message. Optionally, the media file can be attached to the message.

Optionally, a metalink to the media file can be attached to the message. Advantageously, the discriminator can also send different messages with different attachments to different message alert destinations. For example, once the discriminator activates the excise button 25 (STEP 4), a first message alert 19 containing simply a text notification can be sent to a first message alert recipient 17, e.g., the station manager, while a second message alert 19 containing the message with the media file attached can be sent to a second alert message recipient 17, e.g., the program manager or the legal department.

The message alert 19 could also be an audio signal sent to a message alert recipient's cell phone or home phone. Indeed, the message alert transmission media need not be computer-to-computer, the recipient(s) could be any number of computing devices, computers, PDA's, pagers, cell phones, and so forth.

Among the many unique features of the present invention is the ability of the system 10 to handle several record or playback "heads" at one time, which is to say, that input media stream 11 can be read to or written from the delay transmission buffer memory 34 by more than one process at a time. For example, it is possible that first process can be reading input data from region A, e.g., the input media device 31, while another is reading input data from region B to C, and all while a third is writing the data from between B to C to another region, and so on. Thus, the delay transmission buffer memory 34 enables a user to capture something after the fact as long as the data are stored in the delay transmission buffer memory 34.

Although the invention has been described in the context of undesired content, it could just as easily be used to capture, log, and save media file snapshots of the highlights of a transmission. The same software and hardware can be used in another application for producing sound bites from a day's production. The value of capturing 60 or 120 second snapshots of media feed reduces the quantity of data to sift through during or at the end of a broadcast day. Hence, an operator can press the excise button to designate not undesired content to be deleted but choice words to be saved.

The same software and hardware also could be adapted to detect extended periods of "dead air" that are not the result of excising undesired content. The incidence and amount of "dead air" produced during a broadcast day and the periods of such occurrences is valuable information to management. Moreover, the system, after detecting extended period "dead air" could be programmed to replace or override the "dead air" with an another media file, e.g., a short commercial message, and the like, under some circumstances.

Although the invention is described through the above-described exemplary embodiments, it will be understood by those of ordinary skill in the art that modifications to, and variations of, the illustrated embodiments can be made without departing from the inventive concepts disclosed herein. Accordingly, the invention should not be viewed as limited, except by the scope and spirit of the appended claims.

What is claimed is:

1. A transmission delay system for removing undesired content from an input media stream, prior to transmission of a time-delay version of said input media stream, the system comprising:
   a delay transmission buffer memory that is structured and arranged to receive and to temporarily store a temporal quantity of said input media stream data in a buffer or a plurality of buffers;
   an interrupt/delay device that is structured and arranged to receive the input media stream, which has at least one of desired content and undesired content, the interrupt/delay device having:
      a discriminator that is adapted to monitor one or more of the input media stream and the quantity of said input media stream stored in the buffer or the plurality of buffers to identify undesired content contained therein, an excise indicator that is adapted to designate an indicated region of undesired content stored in the buffer or plurality of buffers, and an excise device that, in an excision event, excises or copies (1) the identified undesired content from the indicated region in said buffer or said plurality of buffers, (2) a first predetermined temporal quantity of said input media stream data immediately preceding the indicated region of undesired content, and (3) a second predetermined temporal quantity of said input media stream data immediately following the indicated region of undesired content;

memory for archiving said identified undesired content, said first predetermined temporal quantity of said input media stream data, and said second predetermined temporal quantity of said input media stream data;

a message alert device that is structured and arranged to prepare and transmit, following an occurrence of the excision event, a message alert about the archived undesired content to a message alert recipient, wherein the message alert device is adapted to attach a data file or digital recording containing the identified undesired content to the message alert;

a media output device that is structured and arranged to transmit an output media stream that contains all or less than all of the input media stream stored in the buffer or the plurality of buffers according to a temporal, first-in first-out sequence; and memory for archiving all or less than all of the output media stream for subsequent comparison with at least the archived first and second predetermined temporal quantities of said input media stream data immediately preceding and immediately following the indicated region of undesired content, respectively, thereby facilitating authentication of the undesired content with the output media stream.

2. The system as recited in claim 1, wherein the message alert device is structured and arranged to prepare a message alert selected from the group consisting of: a compressed text message, an uncompressed text message, a compressed graphical message, an uncompressed graphical message, an instant message, a page message, an electronic mail message, and a telephone message.

3. The system as recited in claim 2, wherein the message alert sent further includes as an attachment at least one of:
a data file or recording of the output media stream;
a data file or recording of the input media stream;
an address or metalink to the undesired content archived in the memory for archiving the undesired content; and
an address or metalink to the output media stream archived in the memory for archiving the output media stream.

4. The system as recited in claim 1 further comprising at least one of:
a Web server, to allow users to communicate with and modify the system remotely;
memory for archiving all or less than all of the input media stream, said memory being in electrical communication with the delay transmission buffer memory; and
a database containing a plurality of internal media files, any one of said plurality of files being useable by at least one of the media output device and the interrupt/delay device to overwrite the undesired content at the indicated region in the buffer or the plurality of buffers.

5. The system as recited in claim 1, wherein the discriminator is selected from the group consisting of a human being, a software program, and an electronic device.

6. The system as recited in claim 1, wherein the message alert device is in electronic communication with said at least one message alert recipient via a network.

7. The system as recited in claim 6, wherein the network is selected from the group comprising a local area network, wide area network, the World Wide Web, the Internet or an intranet.

8. The system as recited in claim 1, wherein the message alert device is structured and arranged to provide a first message alert to a first message alert recipient and to provide a second message alert to a second message alert recipient, and
wherein the first message alert is different from the second message alert.

9. The system as recited in claim 1, wherein at least one of the memory for archiving the undesired content and the memory for archiving all or less than all of the output media stream is further adapted to perform one or more of date- and time-stamping each datum in either of said memories and to prepare a reviewable log of each datum in either of said memories.

10. The system as recited in claim 9, wherein data in the memory for archiving the undesired content and corresponding data in the memory for archiving all or less than all of the output media stream are temporally paired when they are one or more of date-stamped and time-stamped, and archived in a common memory.

11. An improvement to a transmission delay system for removing undesired content from an input media stream prior to transmission as an output media stream, the system including a media input device that is structured and arranged to receive the input media stream, an interrupt/delay unit that is structured and arranged to monitor said input media stream, and to identify undesired content contained therein, and a media output device that is structured and arranged to transmit an output media stream that contains all or less than all of the input media stream in a temporal, first-in first-out sequence after a time delay, the improvement comprising:
a delay transmission buffer memory that is structured and arranged to receive and to temporarily store a temporal quantity of the input media stream in a buffer or a plurality of buffers;

an excise device that is structured and arranged, in an excision event, to excise or copy (1) the identified undesired content from the input media stream stored in the delay transmission buffer memory, (2) a first predetermined temporal quantity of said input media stream immediately preceding a region of the identified undesired content, and (3) a second predetermined temporal quantity of said input media stream immediately following the region of the identified undesired content;

memory for archiving the excised undesired content, said first predetermined temporal quantity of said input media stream, and said second predetermined temporal quantity of said input media stream;

a message alert device that is structured and arranged to prepare and to transmit, following an occurrence of the excision event, an alert message about the archived undesired content to a message alert recipient, wherein the message alert device is adapted to attach a data file or digital recording containing the identified undesired content to the message alert; and memory for archiving all or less than all of the output media stream for subsequent comparison with at least the archived first and second predetermined temporal quantities of said input media stream immediately preceding and immediately following the region of the identified undesired content, respectively, thereby facilitating authentication of the undesired content with the output media stream.

12. The improvement as recited in claim 11, wherein the excise device further includes:
an excise region indicator that is adapted to identify the region containing undesired content in the input media stream stored in the buffer or the plurality of buffers for excising.

13. The improvement as recited in claim 11, wherein the memory for archiving the excised undesired content is adapted to perform at least one of log, time-stamp, date-stamp, and record each datum of undesired content stored therein.

14. The improvement as recited in claim 11 further including a user interface panel having at least one of:
a display device, for displaying at least one of a state of the system, data, a message, and an inquiry;
a navigational device for navigating through applications or driver programs that are displayed on the display device;
an excise button that is adapted to copy or excise undesired content stored in the buffer or series of buffers in the delay transmission buffer memory, to save the undesired content in the memory provided therefor, and to generate and transmit at least one message alert to at least one message alert recipient;
a bypass button that is adapted to collapse any transmission time delay to zero and to electrically couple the media input device to the media output device such that the input media stream and the output media stream are identical;
a build button that is adapted to initiate storing all or less than all of the input media stream in the buffer or series of buffers of the delay buffer transmission memory;
a cough button that is adapted to prevent less than all of the input media stream from being stored in the buffer or series of buffers of the delay buffer transmission memory; and
an exit button that is adapted to connect the media input device to the media output device for delay-free and monitor-free transmission of the input media stream and to transmit any input media stream stored in the delay transmission buffer memory on a first in, first out basis.

15. A method of delaying transmission of an input media stream by a pre-determined time delay and of preserving excised content for further use, the input media stream having a first content portion to be transmitted for broadcast and a second content portion that is at least one of to be transmitted, not to be transmitted, and archived for later transmission, the method comprising the steps of:
receiving the input media stream at a first time;
building a delay transmission buffer memory of said input media stream, the delay transmission buffer memory adapted to temporarily store a temporal quantity of said input media stream;
monitoring the input media stream stored in the delay transmission buffer memory to identify the second content portion;
excising or copying the identified second content portion from the delay transmission buffer memory to a first memory for archiving, wherein the excising or copying includes:
designating an indicated region in the input media stream temporarily stored in the delay transmission buffer memory, the indicated region corresponding to a beginning of the identified second content portion,
measuring from the indicated region a first predetermined temporal length immediately before the indicated region and a second predetermined temporal length after the indicated region, and
in an excision event, excising or copying the indicated region including the first predetermined temporal length and the second predetermined temporal length;
archiving, in the first memory, the excised or copied identified second content portion, the first predetermined temporal length immediately before the indicated region, and the second predetermined temporal length after the indicated region;
automatically sending, following an occurrence of the excision event, at least one message alert about the archived second content portion over a network to at least one message recipient upon excising or copying the identified second content portion, wherein a data file or digital recording of the excised or copied identified second content portion is included as an attachment to the at least one message alert;
transmitting a time-delayed version of the input media stream after the time delay as an output media stream; and
archiving the output media stream in a second memory for subsequent comparison with at least the archived first and second predetermined temporal lengths before and after the indicated region corresponding to the beginning of the identified second content portion, respectively, thereby facilitating authentication of the second content portion with the output media stream.

16. The method as recited in claim 15, wherein archiving the identified second content portion in the first memory includes at least one of logging said identified second content portion, time-stamping said identified second content portion, date-stamping said identified second content portion, and recording an address of said identified second content portion within said first memory.

17. The method as recited in claim 15, wherein the method includes selectively bypassing the monitoring, excising or copying, archiving, and issuing steps so that the input media stream is transmitted as the output media stream without the time delay.

18. The method as recited in claim 15, wherein the at least one message alert is selected from the group consisting of:
a compressed text message, an uncompressed text message, a compressed graphical message, an uncompressed graphical message, an instant message, a page message, an electronic mail message, and a telephone message.

19. The method as recited in claim 15, wherein transmitting includes using at least one of time expansion, time compression, overwriting, and bleeping to replace excised content portions of the input media stream.

* * * * *